United States Patent [19]

Snyderwine

[11] Patent Number: 4,853,900

[45] Date of Patent: Aug. 1, 1989

[54] STABILIZED SUSPENSION FOR IMMERSIBLE APPARATUS

[75] Inventor: Martha E. Snyderwine, Holland, Pa.

[73] Assignee: The United States of America as represented by the Secretary of the Navy, Washington, D.C.

[21] Appl. No.: 111,844

[22] Filed: Oct. 19, 1987

[51] Int. Cl.[4] .......... H04B 1/59

[52] U.S. Cl. .......... 367/4; 441/1; 367/3

[58] Field of Search .......... 367/3, 4, 117; 114/326; 441/1, 26, 22

[56] References Cited

U.S. PATENT DOCUMENTS

| | | | |
|---|---|---|---|
| R. 28,671 | 1/1976 | Widenhofer | 441/22 |
| 3,299,398 | 1/1967 | Hersey et al. | 367/3 |
| 3,354,860 | 11/1967 | Dale et al. | 367/3 |
| 3,372,368 | 3/1968 | Dale et al. | 367/3 |
| 3,696,325 | 10/1972 | Tallman | 367/3 |
| 3,711,821 | 1/1973 | Dale et al. | 367/3 |
| 3,992,737 | 11/1976 | Duel et al. | 367/3 |
| 4,747,084 | 5/1988 | Parlant | 367/3 |

*Primary Examiner*—Thomas H. Tarcza
*Assistant Examiner*—Daniel T. Pihulic
*Attorney, Agent, or Firm*—Henry Hansen; Susan E. Verona; John M. O'Meara

[57] ABSTRACT

Motion of an instrument suspension cable assembly is attenuated in a liquid having flow fields and surface swells. Strumming which causes vibratory motion is precluded by enclosing the cable assembly along the axis of suspension to isolate it from the flow fields. Motion along the axis of suspension due to the surface swells is substantially reduced by incorporating drag therealong on the cable assembly enclosure.

4 Claims, 2 Drawing Sheets

STABILIZED SUSPENSION FOR IMMERSIBLE APPARATUS

STATEMENT OF GOVERNMENT INTEREST

The invention described herein may be used by and for the Government of the United States of Amreica for governmental purposes without the payment of any royalties thereon or therefore.

BACKGROUND OF THE INVENTION

The present invention relates generally to immersible apparatus and more particularly to the attenuation of motion which is encountered by such apparatus due to flow fields occurring in the liquid medium and surface swells occurring thereon.

Immersible apparatus, such as hydrophones, is often suspended on a cable for intended orientation along a substantially vertical axis in a liquid, with the functional purpose thereof being related to such endeavors as oceanographic research, marine seismology or underwater search operations. Such apparatus is often deployed from a drop package and can best be utilized when the position thereof is substantially static in the liquid. However, the position of such apparatus is subject to constant change when the liquid is a large body of water, such as an ocean, wherein currents tend to strum the suspended cable which causes vibratory motion therein and surface swells tend to move the suspended cable along the substantially vertical axis. Measures are known for reducing the effects of surface swells and/or strumming. In regard to the latter, elasticity in the structure supporting the apparatus suspension cable is combined with the weight and/or drag of that cable to stabilize the vertical position thereof, while a fringe is commonly disposed along the length of the suspended cable for damping purposes in regard to the former, as disclosed by U.S. Pat. No. 3,696,325. Furthermore, a hydroplane extended from a streamer cable, as disclosed by U.S. Pat. No. 3,354,860 could be utilized to reduce the effects of both surface swells and strumming. Other more sophisticated suspension cable stabilizing schemes are known but include many individual parts which must be assembled and occupy space in the drop package. Therefore, both the manufacturing costs and packaging volume of such suspension cables are considerable which disfavors the utilization thereof.

SUMMARY OF THE INVENTION

It is the general object of the present invention to provide a substantially motion stabilized cable for suspending immersible apparatus.

It is a specific object of the invention to avoid vibratory motion in accordance with the above stated general object by precluding vortex shedding from the cable.

It is another specific object of the present invention to substantially reduce the vertical motion of the cable, in accordance with the above stated general object, when swells occur on the liquid surface.

These and other objects are accomplished in accordance with the motion stabilizing concepts of the invention by enclosing the suspension cable about its longitudinal axis to provide isolation from any flow fields in the liquid. When the apparatus suspension cable is elastically supported from a flotation device, vertical motion thereof resulting from surface swells is attenuated by precluding flow through the cable enclosure to increase drag in either vertical direction. The scope of the present invention is only limited by the appended claims for which support is predicated on the preferred embodiments hereinafter set forth in the following description and the attached drawings wherein like referenced characters refer to like parts throughout the several figures.

DESCRIPTION OF THE PREFERRED EMBODIMENTS

Figure 1:
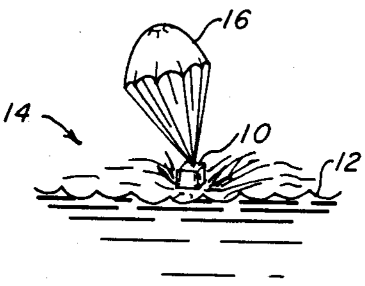
FIG. 1 illustrates delivery by parachute of a drop package from which apparatus is deployed for suspension in a liquid on the cable assembly of the invention.
Figure 2:
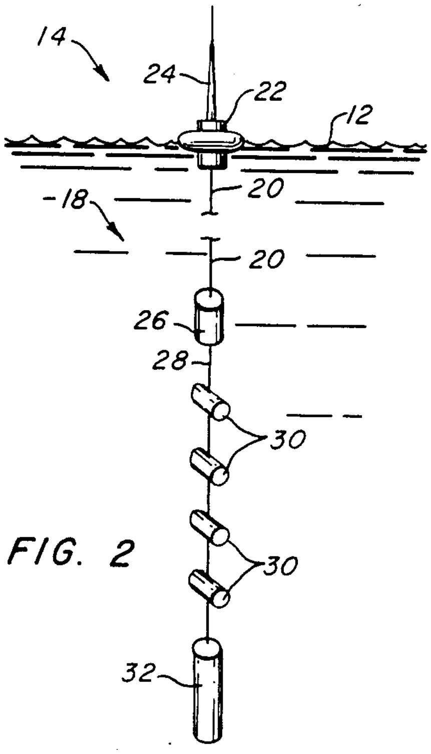
FIG. 2 illustrates a prior art cable assembly with the apparatus ideally deployed along a substantially vertical axis.

In oceanographic research, marine seismology and underwater search operations, it is often necessary to suspend apparatus such as instruments like sensors, lights or cameras from a cable in a liquid. As shown in FIG. 1, delivery of such apparatus to a desired location is commonly accomplished in a drop package 10 which can be thrown from a ship or airplane to the surface 12 of the liquid 14 such as an ocean, with a parachute 16 being utilized when the latter is the case. Upon impact with the surface 12, the drop package 10 deploys a cable assembly 18 from which the apparatus is ideally suspended along a vertical axis, as shown in FIG. 2. The cable assembly 18 of FIG. 2 is commonly known and is supported by an elastic cable 20 that connects to a flotation device 22 having communications equipment thereon from which an antenna 24 extends. A negatively buoyant isolation mass 26 may be utilized for interconnecting the cable assembly 18 to the elastic cable 20. In the cable assembly 18, a non-elastic cable 28 is affixed to at least one instrument 30, such as a sensor, and has a negatively buoyant isolation mass 32 connected at the free end thereof. Of course, signal wires (not shown) are connected between the communications equipment on the flotation device 22 and the instruments 30 which are each precisely spaced in the vertical alignment at a stratum parallel to the ocean surface 12.

The elasticity of cable 20 and the magnitudes of the masses 26 and 32 are selected to substantially maintain the vertical position or stratum of each instrument 30 in the ocean 14 when the surface 12 swells to impose lift forces on the flotation device 22. Of course, those skilled in the art will understand without further explanation that this is accomplished due to the momentum of the masses 26 and 32 that substantially establish a position or mechanical ground from which the elastic cable 20 can extend in length to compensate for increases in the height of the surface 12. Although the elastic cable 20 and the masses 26 and 32 help somewhat to maintain the stability of the cable assembly 18 in the vertical direction when flow fields caused by currents in the ocean 14 are impressed thereagainst, they are of little help when flow fields of substantial magnitude are encountered.

Figure 3:
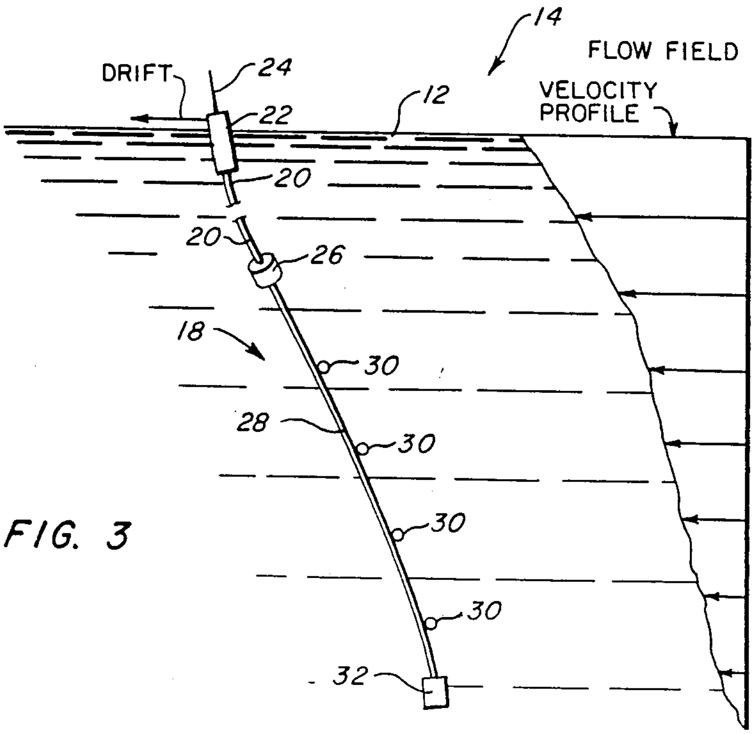
FIG. 3 illustrates a more realistic deployment of the apparatus on the prior art cable assembly of FIG. 2, which results due to the existence of a flow field in the liquid.

The cable assembly 18 will stream or tilt as illustrated in FIG. 3, when a significant flow field is encountered. As is typical, the velocity of the currents in the flow field generally decrease with increasing depth of the ocean 14 and the drift velocity of the cable assembly 18 will be less than the velocity of the currents in the flow field because of its drag characteristic in the direction thereof. This differential velocity results in vortex shedding from the cable 28 which is strummed thereby to cause vibratory motion therein. Such motions not only varies the position of the instruments 30 in the ocean 14, but also causes spurious signals to be generated when the instruments 30 are piezoelectric device for monitoring parameters such as pressure or acceleration.

Figure 4:
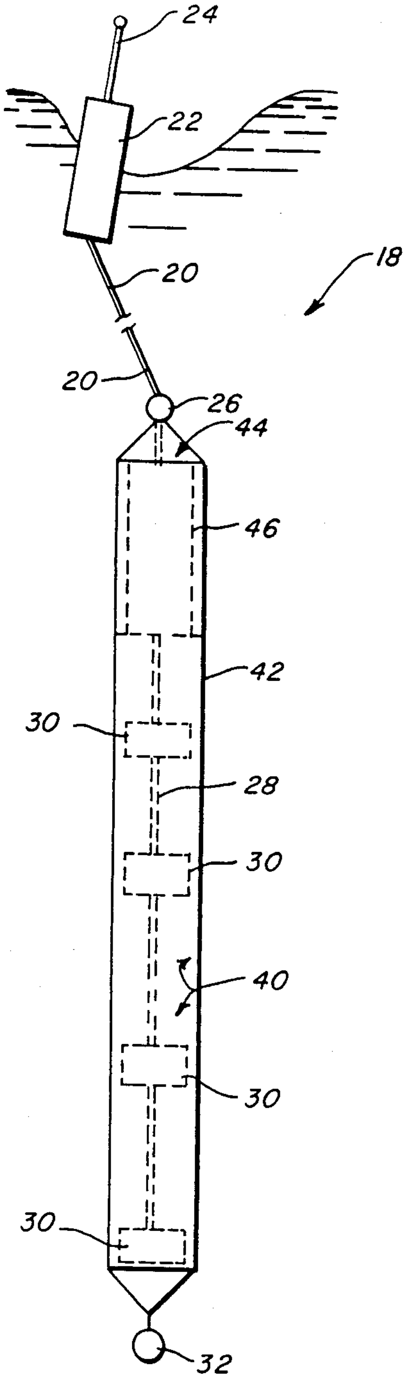
FIG. 4 illustrates some preferred cable assembly embodiments of the invention and shows the cable assembly thereof suspended in a liquid having surface swells.

Various embodiments of the invention are illustrated in FIG. 4 where at least one instrument 30 is affixed to the cable assembly 18 at some stratum along the vertical axis thereof. In one embodiment, means 40 for enclosing about the cable 28 along the vertical axis is disposed to isolate it from the flow field of the ocean 14. Because of this isolation, votex shedding does not occur on the cable 28 and therefor, the vibratory motion which normally accompanies such shedding is precluded.

To implement the enclosing means 40 in a preferred embodiment of the invention, at lease one sleeve 42 of nonporous material, such as rip stop nylon or plastic, is substantially disposed cylindrically about the cable 28. Upon deployment of the cable assembly 18, the sleeve 42 fills from either or both ends thereof with ocean water which remains substantially stagnant therein. Consequently, no vortex shedding occurs from the cable 28 to result in strumming because the flow field is isolated therefrom. Also, the sleeve 42 will present substantial rigidity in the ocean 14 and therefore, less tilt will be encountered by the cable assembly 18. This is so because forces developed against the sleeve 42 by the flow field will be distributed substantially along the entire length thereof. Furthermore, due to the greater diameter of the sleeve 42 relative to the cable 28, greater drag will be encountered therewith to result in less drift being encountered by the cable assembly 18 in the ocean 14. Those skilled in the art will appreciate without any further explanation that the sleeve 42 is particularly appropriate for accomplishing these advantages when a very small diameter optical fiber is utilized as the cable 28.

Figure 5:
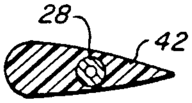
FIG. 5 illustrates another preferred cable assembly embodiment of the invention wherein the cable enclosure is faired to have a drop shaped cross-sectional configuration.
Figure 6:
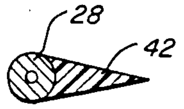
FIG. 6 illustrates still another preferred cable assembly embodiment of the invention wherein the cable enclosure is faired to have a wedge shaped cross-sectional configuration.

As shown in FIGS. 5 and 6, the sleeve 42 does not have to be cylindrical and in other preferred embodiments, it can be faired along its length to serve as an orientation vane which maintains the position thereof relative to the flow field in the ocean 14. Of course, when faired, the sleeve 42 may have any cross-sectional configuration, for example, that of a tear drop as shown in FIG. 5, or a wedge as shown in FIG. 6. Also, the cable 28 need not be concentrically located within the sleeve 42, as illustrated in FIG. 6. Furthermore, where greater tilt can be tolerated, a plurality of sleeves 42 may be disposed along the vertical axis of the cable assembly 18, such as by having each sleeve 42 individually enclose one segment of the cable 28 which extends between the instruments 30.

In another embodiment of the invention, a means 44 for precluding flow through the sleeve 42 can be incorporated to produce substantial drag when forces are applied to move the cable assembly 18 in either vertical direction through the liquid. Because of this drag, the cable assembly 18 will tend to stay motionless by resisting gravitational forces when the surface level of the ocean 14 decreases or by resisting pull forces to extend the elastic cable 20 when the surface level of the ocean 14 increases. To implement the flow precluding means 44 in one embodiment of the invention, a hydraulic valve 46 is disposed in one end of each sleeve 42. This valve 46 is controlled to permit flow of the ocean water into the sleeve 42 during deployment of the instruments 30. Of course, those skilled in the art will understand without further explanation that such control of the valve 46 could be via an electrical signal from the communications equipment on the flotation device 22. Where the cable assembly 18 has only a marginally negative buoyancy, the gravitation forces when the surface level of the ocean 14 decreases are of little concern. Consequently, each valve 46 could be a mechanical check type disposed to permit flow through the sleeves 42 in only one direction with inflow at the bottom end thereof and discharge at the top end. Furthermore, a permanent cap (not shown) at either or both ends of the sleeves 42 could also be utilized in other embodiments of the invention. Of course when such permanent caps are utilized, flow into the sleeve 42 during deployment must be provided for through the sleeve wall, such as with holes or slots disposed in close proximity to the permanent caps.

Figure 7:
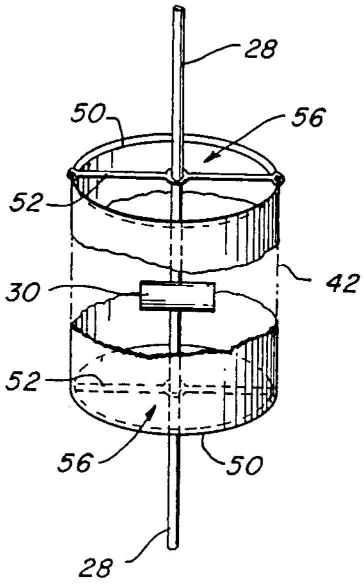
FIG. 7 illustrates a further preferred cable assembly embodiment of the invention wherein the cable enclosure is secured to the cable with hoop and cross member combinations.

Of course, each sleeve 42 must be secured relative to the cable 28, which can be accomplished in many different ways within the scope of the invention. Because it is desirable to pack or fold the sleeves 42 into the drop package 10, size reducible combinations of hoops 50 and cross-members 52 made of resilient material such as plastic or metal would be utilized at each end of th sleeves 42, in the preferred embodiments of the invention. One such embodiment is illustrated in FIG. 7 wherein a single sleeve 42 is cut away to show the cable 28 passing therethrough and a single instrument 30 disposed therein. Cable 28 passes through each cross-member 52 and is attached thereto as shown at locations 56. Due to the resilient nature of the hoops 50 and cross-members 52, each sleeve 42 is urged to unfold about the cable 28 upon deployment of the instruments 30 from the drop package 10. The sleeves 42 may be of any length or periphery and if necessary, other combinations of hoops 50 and cross-members 52 may be utilized at intermittent locations between the ends thereof.

Those skilled in the art will appreciate without any further explanation that many modifications and variations are possible to the above disclosed cable assembly embodiments within the concept of this invention. Consequently, it should be understood that all such modifications and variations fall within the scope of the following claims.

What I claim is:

1. Apparatus for suspending at least one instrument on a cable along a substantially vertical axis in a liquid having a flow field associated therewith and wherein the improvement comprises:
   at least one sleeve for enclosing about said cable and instruments along said axis to provide isolation therefor from the vibrational effects caused by vortex shedding on said cable and instruments due to the flow field of the liquid, each said sleeve presenting top and bottom ends along said axis and said sleeves being filled with the liquid during deployment of said instruments; and
   an elastic cable to which said cable is connected for suspension; and
   at least one hydraulic valve disposed in at least one of said sleeves for precluding flow therethrough after deployment of said instruments, said hydraulic valves being effective to substantially increase drag along said axis and thereby reduce the vertical motion encountered by said cable and instruments when surface swells occur in the liquid.

2. The apparatus of claim 1 wherein each said hydraulic valve is of a mechanical check type and is disposed to permit flow through its said sleeve in only one direction with inflow at the bottom end thereof and discharge at the top end.

3. A drop package from which at least one instrument is deployed for suspension on a cable along a substantially vertical axis in a body of water having a flow field associated therewith, and wherein the improvement comprises:
   at least one sleeve for enclosing about said cable and instruments along said axis to provide isolation therefor from the vibrational effects caused by vortex shedding on said cable and instruments due to the flow field of the water, each said sleeve presenting top and bottom ends along said axis and said sleeves being filled with the water during deployment of said instruments; and
   an elastic cable to which said cable is connected for suspension; and
   at least one hydraulic valve disposed in at least one of said sleeves for precluding flow therethrough after deployment of said instruments, said hydraulic valves being effective to substantially increase drag along said axis and thereby reduce the vertical motion encountered by said cable and instruments when surface swells occur in the water.

4. The drop package of claim 3 wherein each said hydraulic valve is of a mechanical check type and is disposed to permit flow through its said sleeve is only one direction with inflow at the bottom end thereof and discharge at the top end.

* * * * *